(12) United States Patent
Koesters et al.

(10) Patent No.: US 12,467,594 B2
(45) Date of Patent: Nov. 11, 2025

(54) HOLDING ARRANGEMENT AND LIGHT MODULE

(71) Applicant: HELLA GmbH & Co. KGaA, Lippstadt (DE)

(72) Inventors: Werner Koesters, Coesfeld-Lette (DE); Michael Lakenbrink, Oelde (DE); Thomas Wiese, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/413,639

(22) Filed: Jan. 16, 2024

(65) Prior Publication Data

US 2024/0240767 A1    Jul. 18, 2024

(30) Foreign Application Priority Data

Jan. 16, 2023   (DE) .................... 10 2023 100 838.2

(51) Int. Cl.
*F21S 41/19*    (2018.01)
*F21S 41/25*    (2018.01)

(52) U.S. Cl.
CPC ............. *F21S 41/192* (2018.01); *F21S 41/25* (2018.01)

(58) Field of Classification Search
CPC ................................ F21S 41/192; F21S 41/25
See application file for complete search history.

(56) References Cited

U.S. PATENT DOCUMENTS

| | | | |
|---|---|---|---|
| 2004/0032744 A1* | 2/2004 | Nishizawa | F21S 43/50 362/455 |
| 2005/0154087 A1 | 7/2005 | Kobayashi | |
| 2015/0130941 A1 | 5/2015 | Bauer et al. | |
| 2017/0328535 A1* | 11/2017 | Yagi | F21V 29/504 |
| 2024/0035638 A1 | 2/2024 | Cramer et al. | |

FOREIGN PATENT DOCUMENTS

| | | |
|---|---|---|
| CN | 209839962 U * | 12/2019 |
| CN | 111911827 A | 11/2020 |
| DE | 102012206831 A1 | 10/2013 |

(Continued)

OTHER PUBLICATIONS

Thorsten Pflamm-Jonas: "Auslegung und Dimensionierung von kurzfaserverstaerkten Spritzgussbauteilen" Technische Universitaet Darmstadt, 2001.

(Continued)

*Primary Examiner* — Elmito Breval
(74) *Attorney, Agent, or Firm* — Muncy, Geissler, Olds & Lowe, P.C.

(57) ABSTRACT

A holding arrangement for lenses of a lighting device for vehicles with a number of lenses which are arranged axially spaced from one another and which are enclosed by a surrounding body formed of two half shells firmly connected to one another, wherein the surrounding body has a plastic material, wherein the surrounding body has such an axial length and holder that a light source unit of the lighting device is enclosed in an end region of the surrounding body to form a light module and that the plastic material is filled as a thermoplastic or thermosetting material or as a composite material with at least one thermal expansion-reducing additional material.

13 Claims, 1 Drawing Sheet

(56) References Cited

FOREIGN PATENT DOCUMENTS

DE 102021108094 A1 10/2022
EP 3699662 A1 * 8/2020

OTHER PUBLICATIONS

German Office Action dated Aug. 11, 2023 in corresponding application 10 2023 100 838.2—partial translation identifies relevant portion of cited document Thorsten Pflamm—"Auslegung und Dimensionierung von kurzfaserverstaerkten Spritzgussbauteilen" Technische Universitaet Darmstadt, 2001.

* cited by examiner

HOLDING ARRANGEMENT AND LIGHT MODULE

This nonprovisional application claims priority under 35 U.S.C. § 119(a) to German Patent Application No. 102023100838.2, which was filed in Germany on Jan. 16, 2023, and which is herein incorporated by reference.

BACKGROUND OF THE INVENTION

Field of the Invention

The invention relates to a holding arrangement for lenses of a lighting device for vehicles with a plurality of lenses which are arranged axially spaced from one another and which are enclosed by a surrounding body formed of two half shells firmly connected to one another, wherein the surrounding body has a plastic material. Further, the invention relates to a light module for vehicles.

Description of the Background Art

DE 10 2021 108 094 A1, which is incorporated herein by reference, discloses a holding arrangement for lenses of a lighting device, which has a surrounding body formed of two half shells. Advantageously, assembly can be simplified in this way, because the lenses are first inserted into a first half shell and then fixed in the intended mounting position by placing the second half shell on top. Maintaining the relative position of the lenses in relation to each other is necessary for the sharply contoured imaging of light sources of a high-resolution headlight in the area in front of the vehicle. Maintaining the positional accuracy of the lenses over a temperature range must be ensured.

SUMMARY OF THE INVENTION

It is therefore the object of the present invention to further develop a holding arrangement and a light module in such a way that a long-term stable, precisely positioned arrangement of lenses relative to each other and to a light source is ensured, wherein a temperature dependence is avoided in particular.

To achieve the object, the invention is characterized in that the surrounding body has such an axial length and holder that a light source unit of the lighting device is enclosed in an end region of the surrounding body to form a light module and in that the plastic material is filled as a thermoplastic or thermosetting material or as a composite material with at least one thermal expansion-reducing additional material.

An advantage of the invention is that a long-term stable, precise positioning of lenses relative to each other and to a light source unit is ensured. For this purpose, a surrounding body, comprising the lenses and the light source unit, has a plastic material with a thermal expansion-reducing additional material. According to the invention, not only a positionally precise holding of the lenses but moreover also a positionally precise holding of the light source unit occur, so that a structural unit is formed which can be mounted in a headlight housing. Because the plastic material is filled with a thermal expansion-reducing additional material, the positional accuracy of the lenses and light source unit can be ensured over a specified temperature range.

The plastic material can be an amorphous thermoplastic material. The thermal expansion-reducing additional material can be designed as a fiber material which runs oriented in the direction of an axis of the holding arrangement. This gives the fibers of the fiber material a defined orientation in the axial direction. This advantageously achieves a reduced thermal expansion of the surrounding body in the longitudinal direction, wherein a permanently constant distance of the lenses to one another or to the light source unit can be maintained.

The fiber material can have fibers which run within the plastic material through an advantageous component filling oriented predominantly in the axial direction of the surrounding body. Such an orientation of the fibers in the longitudinal direction can be achieved by a targeted longitudinal injection in a molding tool for producing the half shells.

The plastic material of the surrounding body can be filled with predominantly isotropic thermal expansion-reducing additional materials. Minerals, glass beads, glass powder, organic-based materials, formed of renewable raw materials, such as ground shells, seeds, etc., can be used as additional materials (fillers).

The advantage of these materials is that they are isotropic in terms of shrinkage and thermal expansion.

The surrounding body can have a thermal expansion quotient $\alpha$ in a range between $10 \times 10^{-6}$/K and $40 \times 10^{-6}$/K. In this way, the thermal expansion can be reduced to a range that applies to metal materials.

The lenses and/or the light source unit can be fixed in the mounting position by a number of spring elements arranged distributed in the circumferential direction. The ends of the spring elements are arranged oriented in such a way that they press an edge of the respective lens or light source unit against a stop surface of the surrounding body. A defined positioning of the lenses or light source unit can advantageously result thereby. The stop surfaces and the spring elements each form holder of the fastening region within the surrounding body.

The spring elements can be arranged inserted in a receptacle of the surrounding body. Advantageously, the spring elements can be easily inserted into the surrounding body thereby. Preferably, the receptacle is slot-shaped, wherein security against loss of the spring elements is ensured. Tolerances of the lens diameters can be compensated by the spring elements.

The half shells of the surrounding body can have an identical design. This is realized by producing or forming the two half shells using the same mold half. In this way, an exact coaxial positioning of the lenses and the light source unit can advantageously be achieved.

The light source unit can have a printed circuit board and a number of light sources arranged on the same. The light source unit closes the hollow-cylindrical surrounding body in a rear end region and a front lens closes the surrounding body in a front end region of the same, so that the surrounding body is closed. This prevents dust particles from penetrating into the interior of the surrounding body.

Also, a light module can be formed which includes the surrounding body, a plurality of lenses, and a light source unit. This light module can be fastened as a structural unit to a housing of a lighting device designed as a headlight. For this purpose, the surrounding body has at least one transversely projecting fastening flange, which has a larger radial radius than the surrounding body walls having the spring elements. This can advantageously reduce the manufacturing and assembly costs.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
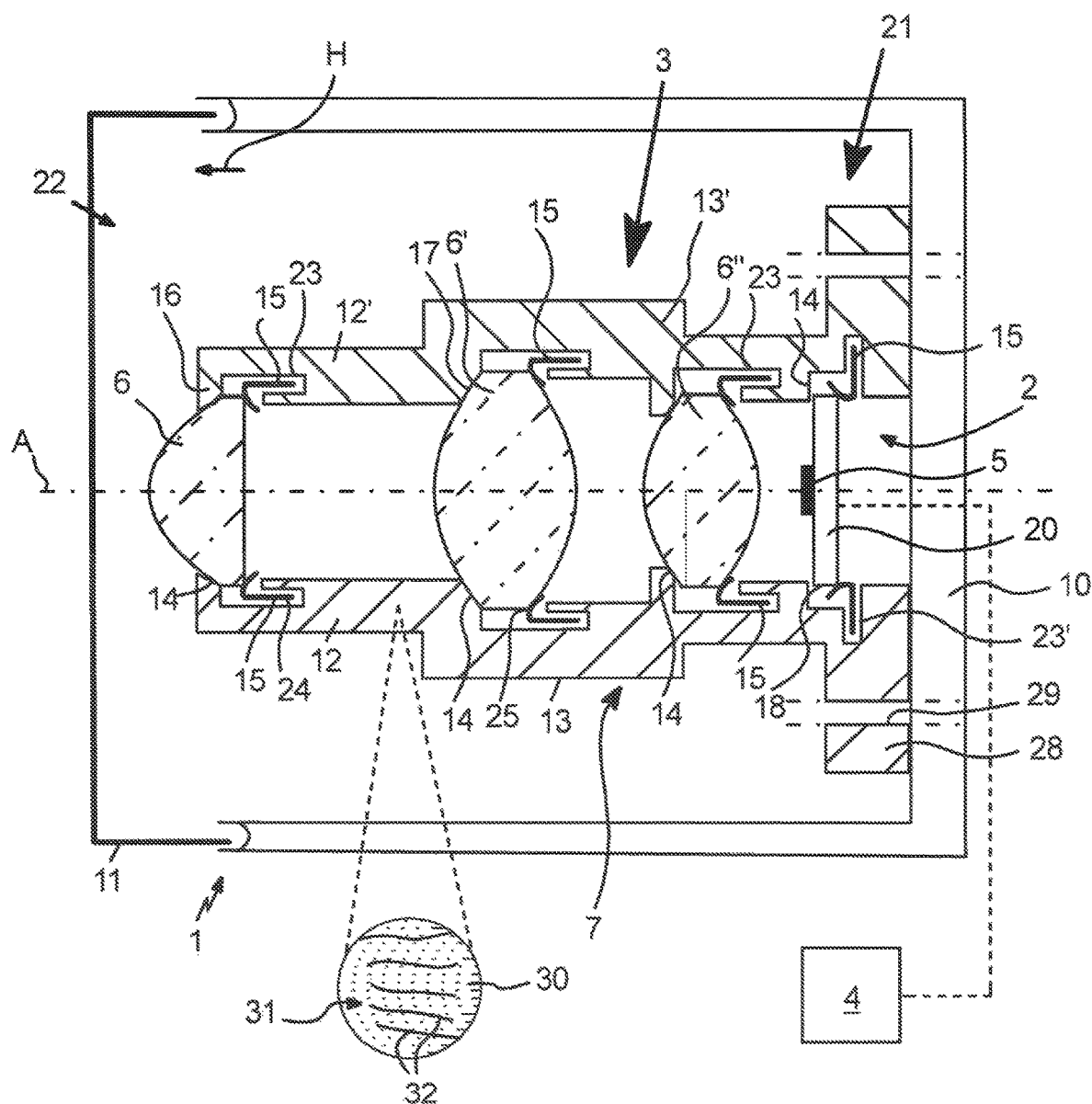
FIG. 1 shows a cross section through a lighting device for vehicles.
Figure 2:
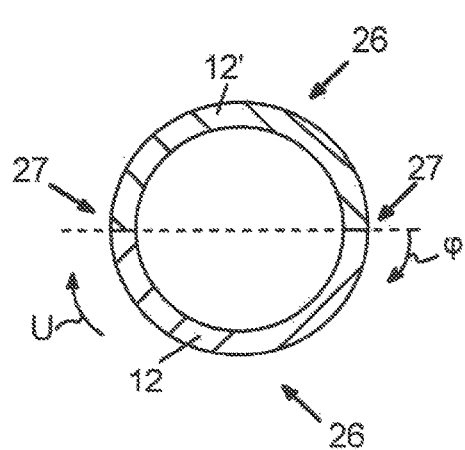
FIG. 2 shows a cross section through the surrounding body without lenses.

A lighting device shown in FIG. 1 can be designed as a high-resolution headlight 1, which is used to generate different light distributions depending on the current driving situation of the vehicle (dynamic light distribution). Headlight 1 essentially has a light source unit 2, an optical unit 3, and a control unit 4 for controlling light source unit 2.

Light source unit 2 has a number of light sources 5 which are arranged in a matrix-like manner and which are imaged by optical unit 3 to form light spots in an area in front of the vehicle. For example, the matrix can have 256 rows and 64 columns to form more than 16,000 light sources 5. Light sources 5 can be controlled individually. The light distribution is therefore pixel-like, so that different light distributions, for example, a low beam distribution, a glare-free high beam distribution, and the like, can be generated depending on a control signal generated by control unit 4. In the case of the glare-free high beam distribution, individual areas of the high beam distribution can be omitted so that traffic objects are not dazzled.

Optical unit 3 comprises a plurality of lenses 6, 6', 6", which are arranged offset to one another along an axis A.

Light source unit 2 and optical unit 3 are fixed in a holding arrangement 7 and together with it form a light module 8, which is fastened to a housing 10 of headlight 1 via a fastener. The pot-shaped housing 10 is closed by a transparent cover plate 11.

As can be seen in FIG. 1, light sources 5, which are preferably designed as LED light sources, are arranged on the optical axis A, along which lenses 6 run spaced apart from each other.

Holding arrangement 7 is designed as a hollow-cylindrical surrounding body formed of two half shells 12, 12'. A first half shell 12 and a second half shell 12' are of identical design and their walls 13, 13' run along an inscribed angle φ of 180°. Lenses 6, 6', 6" and light source unit 2 are each arranged in a fastening region of peripheral body 7. For this purpose, it has a stop surface 14, on the one hand, and a spring element 15, on the other. Stop surface 14 can, for example, be formed as a semicircular ring 16 projecting inwards from wall 13, 13' of half shells 12, 12' or as a number of inwardly projecting webs. In the mounting position of lenses 6, 6', 6" and light source unit 2, an edge 17 of the respective lenses 6, 6', 6" and an edge 18 of light source unit 2 are pressed against stop surface 14 by means of spring elements 15 arranged distributed in the circumferential direction U.

Edge 18 of light source unit 2 is also the edge of a printed circuit board 20 of light source unit 2, which is equipped with light sources 5. Printed circuit board 20 is formed rigid. Light sources 5 are arranged on a flat side of printed circuit board 20, said side facing in the main beam direction H of headlight 1.

Surrounding body 7 or half shells 12, 12' have such an axial length that lenses 6 can be arranged at a predetermined axial distance from one another and light source unit 2 can be arranged at a predetermined distance from one another. Light source unit 2 is arranged fixed in a rear end region 21 of surrounding body 7, wherein a rear end face of surrounding body 7 is closed by printed circuit board 20. A front lens 6 is fixedly arranged in a front end region 22, so that a front end face of surrounding body 7 is closed. Because walls 13, 13' of half shells 12, 12' are continuous, i.e., free of openings, surrounding body 7 is arranged closed in this way, in particular light-tight and dust-tight. Unwanted dust cannot penetrate into the interior of surrounding body 7.

In addition to front lens 6, a middle lens 6' and a rear lens 6" are held securely in the same way by pressing edge 17 against stop surface 14 by means of the pretensioned spring element 15.

First half shell 12 and second half shell 12' are detachably connected to each other by a fastener, so that the surrounding body is formed tubular and light-tight on the circumferential side in the mounting position. First half shell 12 and second half shell 12' can, for example, be connected to each other by clamping, screwing, or latching.

Spring elements 15 are preferably made of a metal material. For example, spring elements 15 can be designed as spring plate elements. Spring elements 15 are preferably designed as insertion elements, each of which is inserted into a preferably slot-shaped receptacle 23 of half shells 12, 12'. The slot-shaped receptacles 23 can, for example, be designed as pockets into which spring elements 15 can be inserted with their straight base section 24, whereas a curved spring section 25 of spring element 15 projects radially inwards to engage behind lenses 6, 6', 6".

The slot-shaped receptacles 23 can be arranged distributed in the circumferential direction U; for example, four slot-shaped receptacles 23 can be arranged in the respective fastening regions in the circumferential direction U. This ensures a secure positioning of lenses 6, 6', 6" or light source unit 2. The slot-shaped receptacles 23 of spring elements 15 assigned to lenses 6, 6', 6" run in the axial direction, wherein a main component of the spring force generated by spring elements 15 in the axial direction is ensured. If a main component of the spring force is to run in a radial direction, the slot-shaped receptacle 23' runs in the radial direction, as is intended for holding circuit board 20.

The slot-shaped receptacles 23, 23' can each be arranged in a top region 26 of half shells 12, 12' and in a free end region 27 of half shells 12, 12', wherein spring element 15 associated with the free end region 27 is partially inserted in the slot-shaped receptacle 23 of first half shell 12 and second half shell 12'.

In the rear end region 21 of surrounding body 7, the same has outwardly projecting fastening flanges 28, so that surrounding body 7 can be fixed to housing 10 of headlight 1 via a fastener. For example, screw bolts can be provided as a fastener, which engage in corresponding holes 29 in fastening flange 28.

According to an example, surrounding body 7 or first half shell 12 and second half shell 12' each formed of a plastic material 30 and a thermal expansion-reducing additional material 31. The plastic material 30 can be an amorphous thermoplastic material.

A thermosetting plastic material or a composite plastic material, to which in each case the thermal expansion-reducing additional materials described below are added, can be used instead of the thermoplastic material.

The thermal expansion-reducing additional material 31 can be designed as a fiber material, which can be designed as a glass fiber material. Alternatively, the additional material can be made as carbon fibers, hemp fibers, or cellulose fibers, for example.

The thermal expansion-reducing additional material can be isotropic. For example, minerals, glass beads, glass powder, organically based materials, formed of renewable raw materials, such as ground shells, seeds, etc., have an isotropic shape or isotropic expansion.

These materials advantageously have an isotropy in terms of shrinkage and thermal expansion.

First half shell 12 and second half shell 12' are injection molded using the same mold, wherein glass fibers 32 of the glass fiber material are arranged oriented in the axial direction of the respective half shells 12, 12' by longitudinal injection molding in the mold cavity. Glass fibers 32 are surrounded by the plastic material. The plurality of glass fibers 32 together form fiber material 31, the mass fraction of which is 35% to 75% of the total mass of the composite material formed of plastic material 30 and fiber material 31.

A linear thermal expansion quotient α of the manufactured half shells 12, 12' or surrounding body 7 in the axial direction of the same is in a range between $10 \times 10^{-6}$/K and $40 \times 10^{-6}$/K. The fiber-filled plastic material of surrounding body 7 has anisotropic thermal expansions, wherein the coefficient of thermal expansion in the transverse direction of surrounding body 7 is at least twice as large as the linear thermal expansion quotient a in the axial direction.

The thermal expansion-reducing fiber material 31 thus allows the thermal expansion to be reduced to a level that applies to metals.

Alternatively, when executed as a thermosetting plastic instead of a thermoplastic material, the filler content can be 35% to 90% of the total mass of the composite material formed of the plastic material and the fiber material.

Further, minerals, glass beads, glass powder, and/or organically based materials, formed of renewable raw materials, such as ground shells and seeds, for example, can be used instead of the fiber material as a thermal expansion-reducing additional material 31 (fillers).

The mass fraction of the additional material is also 35% to 90% of the total mass of the composite material formed from the additional material and plastic material 30. The linear thermal expansion quotient α of surrounding body 7 formed in this way in the axial direction is also in the range between $10 \times 10^{-6}$/K and $40 \times 10^{-6}$/K.

The light module 8 may be assembled as follows:

First half shell 12 and second half shell 12' are produced by injection molding. Preferably by means of a robot, spring elements 15 are inserted into and locked in molded slot-shaped receptacles 23, 23'. First half shell 12 is provided, wherein top region 26 points downwards and the free ends point upwards. Lenses 6, 6', 6" and circuit board 20 with light sources 5 are then inserted into first half shell 12, wherein they are pressed against stop surface 14 by the corresponding spring elements 15. First half shell 12 is equipped with spring elements 15 both at top region 26 and in the end region, whereas second half shell 12' is only equipped with spring elements 15 in top region 26. Second half shell 12' is then mounted from above, wherein an upwardly directed edge 17, 18 of lenses 6, 6', 6" or circuit board 20 is pressed onto stop surface 14 by means of spring elements 15 of second half shell 12'.

First half shell 12 and second half shell 12' are detachably connected to each other via the fastener(s). Finally, surrounding body 7, formed by the joined first half shell 12 and second half shell 12', is fixed to housing 10 using the fastener.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A holding arrangement for lenses of a lighting device for vehicles with at least two lenses that are arranged axially spaced from one another along an axis, the holding arrangement comprising:

a surrounding body enclosing the at least two lenses, the surrounding body comprising two half shells firmly connected to one another, the two half shells including a first half shell that surrounds a first portion of an outer circumference of each lens of the at least two lenses and a second half shell that surrounds a remaining portion of the outer circumference of each lens of the at least two lenses, the surrounding body being formed of a plastic material, the surrounding body having an axial length and a holder such that a light source unit of the lighting device is enclosed in a rear end region of the surrounding body to form a light module, wherein the plastic material includes a thermoplastic material, a thermosetting plastic material or a composite plastic material, and at least one thermal expansion-reducing additional material, wherein the plastic material includes the thermoplastic material and wherein the at least one thermal expansion-reducing additional material is a fiber material, wherein fibers of the fiber material are oriented to run predominantly in an axial direction of the surrounding body, wherein the light source unit includes a printed circuit board with at least one light source mounted thereon, wherein an inner surface of each of the two half shells has a recess, the recess of each of the two half shells forming a part of the holder, and wherein the printed circuit board is partially inserted into the recess of each of the two half shells to hold the light source unit in the rear end region of the surrounding body.

2. The holding arrangement according to claim 1, wherein the at least one thermal expansion-reducing additional material of the plastic material includes predominantly isotropic thermal expansion-reducing additional materials.

3. The holding arrangement according to claim 1, wherein a mass fraction of the fiber material and/or the at least one thermal expansion-reducing additional material is 35-90% of a total mass of the surrounding body.

4. The holding arrangement according to claim 1, wherein the thermoplastic material is amorphous.

5. The holding arrangement according to claim 1, wherein a linear thermal expansion quotient of the plastic material, in the axial direction of the surrounding body, is in a range between $10 \times 10$-6/K and $40 \times 10$-6/K.

6. The holding arrangement according to claim 1, wherein the at least two lenses and/or the light source unit are each fixed in a respective fastening region in a mounting position within the surrounding body by at least two pretensioned spring elements arranged distributed in a circumferential direction, and wherein a spring section of each of the at least two pretensioned spring elements press an edge of the at least two lenses and/or an edge of the light source unit against a stop surface of the surrounding body.

7. The holding arrangement according to claim 6, wherein the at least two pretensioned spring elements are each arranged in a slot-shaped receptacle of the surrounding body.

8. The holding arrangement according to claim 1, wherein the first half shell has an identical shape as the second half shell.

9. The holding arrangement according to claim 8, wherein the first half shell and the second half shell are connected to each other in a mounting position via a fastener, and wherein the surrounding body is formed tubular in the mounting position and is light-tight and dust-tight on around a circumference thereof.

10. The holding arrangement according to claim 1, wherein the light source unit comprises at least two light sources that are arranged in a matrix and which are arranged on the printed circuit board.

11. The holding arrangement according to claim 10, wherein the at least two lenses include a front lens, and wherein the printed circuit board is arranged in the rear end region of the surrounding body and the front lens is arranged in a front end region of the surrounding body so that the surrounding body is closed.

12. A light module comprising:
   the holding arrangement according to claim 1;
   the at least two lenses enclosed by the surrounding body; and
   the light source unit,
   wherein the light module is fastened to a housing of the lighting device via a fastening flange of the surrounding body.

13. The holding arrangement according to claim 1, wherein the holder further includes springs, wherein at least one of the springs is provided in the recess of each of the two half shells, wherein the springs press the printed circuit board against a stop surface provided in each recess to retain the light source unit.

* * * * *